United States Patent [19]
Ayres

[11] 3,894,951
[45] *July 15, 1975

[54] SERUM/PLASMA SEPARATOR; INTERFACE SEEKING PISTON; RESILIENT APERTURES IN LOWER DIAPHRAGM TYPE

[75] Inventor: Waldemar A. Ayres, Rutherford, N.J.

[73] Assignee: Becton, Dickinson and Company, East Rutherford, N.J.

[ * ] Notice: The portion of the term of this patent subsequent to May 6, 1992, has been disclaimed.

[22] Filed: Feb. 27, 1974

[21] Appl. No.: 446,356

[52] U.S. Cl. .............. 210/136; 210/314; 210/359; 210/516; 210/DIG. 23
[51] Int. Cl. ........................................... B01d 21/26
[58] Field of Search ....... 23/230 B, 258.5, 259, 292; 128/2 F, 21 AR, 218 M, 272; 233/1 A, 1 R, 26; 210/83, 84, 109, 131, 359, 514, 518, DIG. 23, DIG. 24, 136, 314

[56] References Cited
UNITED STATES PATENTS

| | | | |
|---|---|---|---|
| 2,577,780 | 12/1951 | Lockhart | 128/272 X |
| 3,539,300 | 11/1970 | Stone | 210/DIG. 24 |
| 3,661,265 | 5/1972 | Greenspan | 210/359 |
| 3,782,548 | 1/1974 | Bowen | 210/DIG. 23 |

Primary Examiner—Charles N. Hart
Assistant Examiner—Robert H. Spitzer
Attorney, Agent, or Firm—Kane, Dalsimer, Kane, Sullivan and Kurucz

[57] ABSTRACT

A blood collection and separator assembly of the type suitable for centrifuging to separate the plasma or serum from the cellular phase of blood is disclosed. The assembly includes a collection container and an interface-seeking piston slidably disposed therein for sealing off the plasma or serum phase from the cellular or heavy phase of blood after centrifuging is terminated. The piston is formed having a specific gravity greater than the specific gravity of blood. The piston is provided with a pressure responsive valve means in the form of a resilient diaphragm having one or more apertures therein which automatically opens the valve when the assembly is subjected to centrifugal force. Disposed in tandem relationship with the valve means is a filter assembly to filter the plasma or serum as it passes through the valve means when the assembly is being centrifuged and the piston is moving downwardly into the container. The filter assembly also serves as piston stop means to automatically stop the piston at the plasma/serum-cellular interface by clogging the filter assembly with the cellular phase and also automatically closes the valve means so that the piston forms a barrier between the plasma or serum phase and the cellular phase.

6 Claims, 4 Drawing Figures

SERUM/PLASMA SEPARATOR; INTERFACE SEEKING PISTON; RESILIENT APERTURES IN LOWER DIAPHRAGM TYPE

BACKGROUND OF THE INVENTION

This invention relates generally to plasma serum separator assemblies and particularly to a plasma/serum separator having an interface-seeking piston valve assembly. The piston is slidably disposed in a collection container for receiving blood. The piston includes valve means in the form of a resilient diaphragm which is normally closed but which will automatically open when the assembly is subjected to centrifugal force. The piston also includes a filter means disposed in fluid communication with the valve means so that as the plasma or serum passes through the valve means it is filtered to remove any solid materials that may be present in the plasma or serum phase and which also serves as a piston stop means for stopping the piston at the interface between the serum/plasma and cellular phase after the assembly is centrifuged.

DESCRIPTION OF THE PRIOR ART

It is known to separate blood into its component parts by centrifugation, for example, the assembly disclosed in U.S. Pat. No. 2,460,641. However, this particular assembly does not employ a means for sealing the separated plasma or serum phase from the cellular phase.

It is also known to provide assemblies for manually separating the plasma or serum phase from the cellular phase, for example, as disclosed in U.S. Pat. Nos. 3,586,064; 3,661,265; 3,355,098; 3,481,477; 3,512,940 and 3,693,804. In all of these devices the serum is collected in a blood collection container and means are provided for separating the plasma or serum phase from the cellular phase employing filters, valves, transfer tubes or the like.

It is also known to provide assemblies for the sealed separation of blood in which a piston is actuated by centrifugal force such as is disclosed in U.S. Pat. Nos. 3,508,653 and 3,779,383. These devices use either a deformable piston made of a resilient material or valve means associated with the piston to effect a sealed separation after centrifugation.

SUMMARY OF THE INVENTION

It is an object of the present invention to provide a plasma/serum separator assembly in which an interface-seeking piston automatically stops at the plasma/serum cellular interface when centrifuged.

It is another object of the invention to provide a piston with valve means in the form of a resilient diaphragm having one or more apertures therein and which will not be accidentally opened when the container is being filled with blood by the pressure difference of blood at atmospheric pressure and the vacuum on the other side of the valve. It is also an object of the invention to provide a piston having a filter assembly which will prevent solid materials contained in the blood from passing into the separated plasma or serum phase.

It is another object of the invention to provide a filter assembly which also serves as a piston stop means when the piston contacts the plasma/serum-cellular interface when the assembly is centrifuged.

It is another object of the invention to provide a plasma/serum separator assembly which is economical to manufacture and can be used in conjunction with standard blood collecting equipment.

My invention generally contemplates the provision of a separator assembly which includes a blood collection container for receiving blood, the container having at least one open end which is adapted to receive a closure for sealing the end of the container. An interface-seeking piston is formed having a specific gravity greater than the specific gravity of blood. The piston is provided with pressure responsive valve means in the form of a resilient diaphragm having one or more apertures therein which automatically opens when the assembly is subjected to centrifugal force. A filter assembly is disposed in the piston in fluid communication with the valve means so that the plasma and/or serum after passing through the valve means is filtered to remove any solid materials contained in the blood and which serves as a piston stop means to automatically stop the piston at the plasma/serum-cellular interface and close the valve means.

DESCRIPTION OF THE DRAWINGS

For a better understanding of the invention reference is had to the drawings which illustrate preferred embodiments of the invention herein.

DESCRIPTION OF THE PREFERRED EMBODIMENTS

Figure 1:
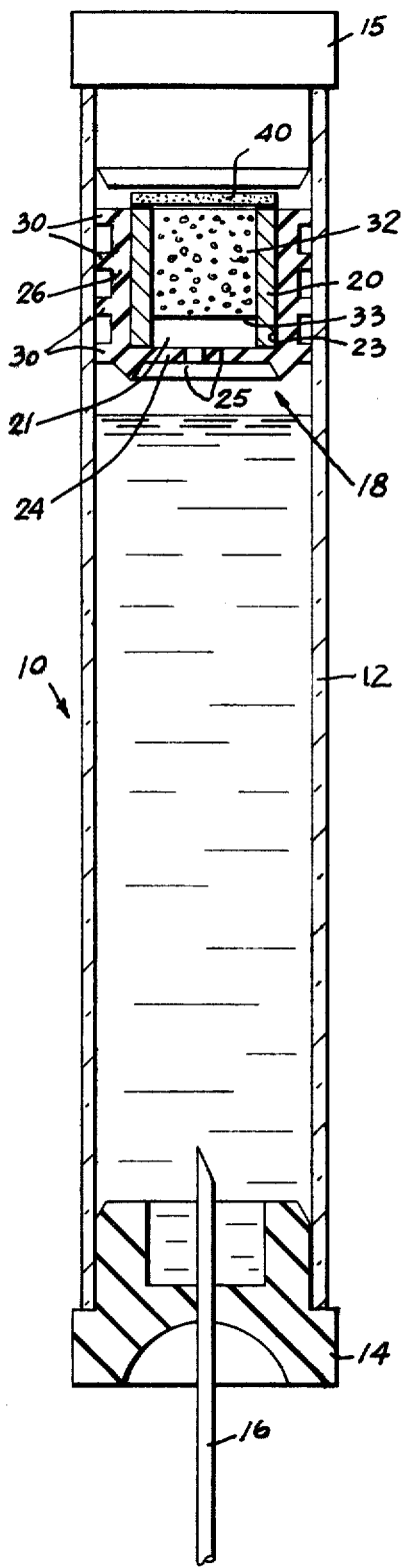
FIG. 1 is a sectional, elevational view of the plasma/serum separator assembly illustrating a pointed cannula penetrating one of the stoppered ends of the container through which blood is introduced into the container prior to its separation.
Figure 2:
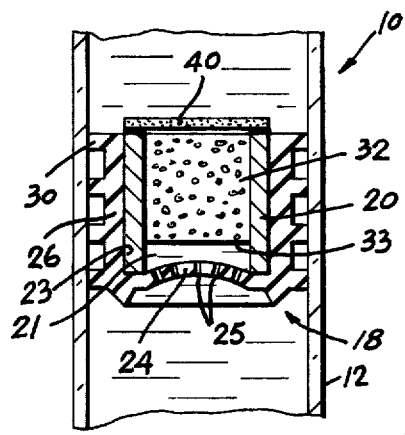
FIG. 2 is a sectional, elevational view partly broken away illustrating the position of the piston approaching the plasma/serum-cellular interface while the assembly is being centrifuged.
Figure 3:
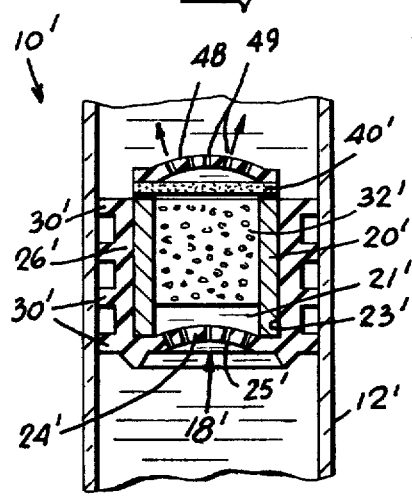
FIG. 3 is a sectional elevational view of the assembly after centrifuging with the piston stopped at the plasma/serum-cellular interface.

For a better understanding of the invention herein a description of the preferred embodiment is had which is illustrated in FIGS. 1 through 3.

In FIG. 1 separator assembly 10 comprises a tubular member or container 12 which is sealed at its open ends by closure members 14 and 15. Closure members 14 and 15 are preferably made of elastomeric material, for example rubber, and are capable of being penetrated by a cannula 16 so that blood can be transferred from a blood source into the container under aseptic conditions. Closures 14 and 15 are preferably made of elastomeric material and should be self-sealing so that when the cannula is removed from closure 14 there will be no loss of blood passing through the penetration portion of closure 14. As depicted in FIG. 1, blood is being conducted through cannula 16 and is shown filling container 12 to about the point where piston 18 is positioned adjacent closure member 15. Thereafter, cannula 16 is removed and assembly 10 is ready for centrifuging for subsequent separation of the collected blood into the plasma or serum phase and the cellular phase. In this connection, apertures 25 of resilient diaphragm 24 remain closed while blood is filling container 12 and will not accidentally be opened by the pressure differential between blood at atmospheric pressure at the lower surface of diaphragm 24 and the vacuum that is present at the upper surface of diaphragm 24.

Disposed in container 12 is piston 18 which includes a tubular metal insert 20 which is mounted in bore or passage 23 of piston 18. Metal insert 20 is preferably made of stainless steel or other rigid chemically inert material having a specific gravity substantially greater than blood. The body of piston 18 is preferably formed of elastomeric material and is formed with a longitudinally extending passage 23 which is dimensioned to receive tubular insert 20 in an interference fit. The bore of tubular insert 20 forms chamber 21 for housing coarse filter 32.

The elastomeric portion of piston 18 comprises an outer tubular wall 26 and formed integrally with wall 26 is a plurality of axially spaced resilient sealing rings 30 which contact the inner wall surface of container 12 in sealing liquid tight engagement. Piston 18 when mounted in the container will maintain a liquid tight sealing contact with the inner wall of container 12 throughout its path of travel within the container during centrifuging.

Coarse filter 32 forms an interference fit with the inner surfaces of metal insert 20. The lower end 33 of coarse filter 32 is spaced from the lower end of metal insert 20.

Resilient diaphragm 24 is made of a suitable elastomer such as rubber and is formed having apertures 25 which are normally closed but which will automatically open when assembly 10 is centrifuged at high speed. Diaphragm 24 extends across the lower end of piston 18 and closes passage 23 of piston 18. Filter 32 is spaced from diaphragm 24 so that the diaphragm can stretch upwardly as seen in FIG. 2 during centrifugation of assembly 10. During centrifugation and before piston 18 reaches the plasma/serum-cellular interface, while the piston is descending, the apertures 25 remain open.

Fine filter 40 is mounted across the top edge of metal insert 20 and is secured thereto by cement or other suitable means. Fine filter 40 has pore openings less than the diameter of the red blood cells so that any plasma or serum containing solid materials of the diameter of a red blood cell will be removed by filter 40. Coarse filter 32 has an average pore size greater than the cellular phase of blood and serves as a prefilter to take out larger particles such as fibrin strands or clots from the plasma or serum before it reaches fine filter 40.

FIG. 2 which is a sectional view partly broken away illustrates the position of piston 18 approaching the plasma/serum-cellular interface before the cellular phase passes through coarse filter 32 and clogs fine filter 40 thereby stopping piston 18 at the interface as shown in FIG. 3. It should be noted that apertures 25 of diaphragm 24 automatically close when fine filter 40 clogs with red cells and the piston descent stops even though centrifuging continues. It should be noted that piston 18 has an average specific gravity substantially greater than the specific gravity of blood. However, piston 18 will automatically stop at the plasma/serum-cellular interface when filter 40 becomes clogged with the cellular phase such as the red blood cells as depicted in FIG. 3 thereby separating the plasma or serum from the cellular phase of blood and forming a sealed barrier between the two phases when centrifuging is completed.

Figure 4:
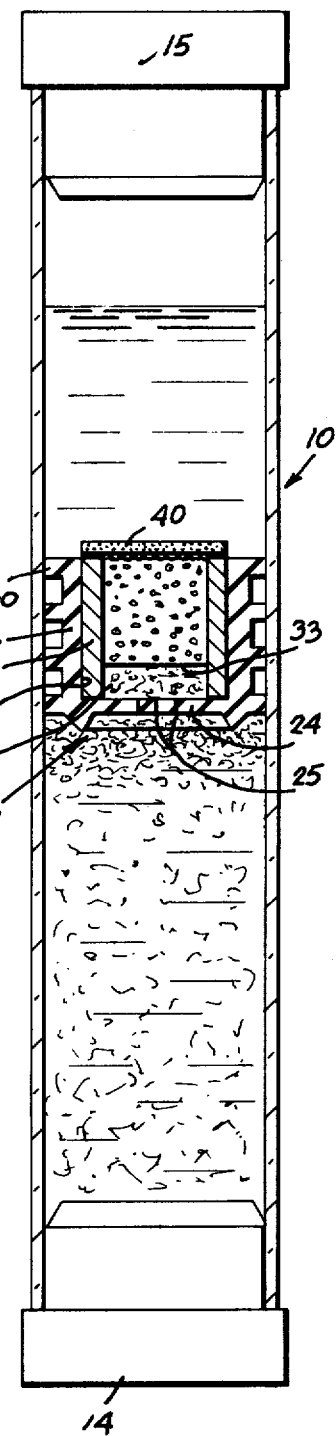
FIG. 4 is a sectional, elevational view partly broken away illustrating another form of a piston approaching the plasma/serum-cellular interface while the assembly is being centrifuged.

FIG. 4 which is a sectional view partly broken away illustrates another form of piston 18. Piston 18' is formed with identical parts as piston 18 and are similarly numbered using primes except that resilient diaphragm 48 having apertures 49 has been added above fine filter 40'. Piston 18' illustrates the position of diaphragms 24' and 48 in a stretched condition during centrifugation with apertures 25' and 49 open to permit the separated plasma/serum to pass through piston 18' during its descent in container 12'. When piston 18' reaches the plasma/serum-cellular interface fine filter 40' becomes clogged and piston 18' stops which automatically enables apertures 25' and 49 of diaphragms 24' and 48 to close so that they return to their sealed condition. Diaphragm 48 functions as a sealed barrier between the separated plasma/serum and fine filter 40' which blocks the top part of the cellular phase. Thus, diaphragm 48 effectively seals the cellular phase from the separated plasma/serum phase.

When using the assembly illustrated in FIGS. 1 through 3 and after the blood has been collected, assembly 10 is placed in a centrifuge and at first is subjected to a spin speed which is suitable to cause the heavy or cellular phase material to pass downwardly in the container toward stopper 14 but is insufficient to cause piston 18 to start its downward movement in assembly 10. Then, the assembly is subjected to a higher spin speed which causes diaphragm 24 to open apertures 25 in piston 18. Piston 18 then continues its movement downwardly in the container in which separated plasma or serum pass through coarse filter 32 and fine filter 40. The hydrostatic pressure of the plasma exerted against diaphragm 24 causes it to stretch upwardly thereby opening apertures or valves 25 to permit the passage of separated plasma or serum through coarse filter 32 and fine filter 40 to the other side of piston 18. When piston 18 reaches the plasma/serum-cellular interface as illustrated in FIG. 3, red cells and other portions of the cellular phase pass through coarse filter 32 and are stopped by fine filter 40 thereby causing filter 40 to become clogged and effectively stop piston 18 at the plasma/serum-cellular interface. Thereafter, even though centrifuging continues diaphragm 24 returns to its sealed condition as in FIG. 1 with apertures 25 closed. When centrifuging is completed the piston is established as a sealed barrier at the interface between the serum/plasma phase and the cellular phase.

From the foregoing, it is readily observed that in a plasma/serum separator assembly in which an interface-seeking piston is disclosed the assembly is described in which blood can be collected, centrifuged, separated into its component phases and is capable of being shipped through the mail for further analytical determinations without the plasma or serum mixing with the cellular phase even though the assembly is inverted and handled roughly.

While variations of the invention herein may be had the objectives of the invention have been illustrated and described and it is contemplated that changes in design can be made without departing from the spirit of the invention described herein.

What is claimed is:

1. A separator assembly capable of separating blood into a plasma/serum or light phase and a cellular or heavy phase comprising:
   a container having at least one open end which is adapted to receive blood for subsequent separation into a light phase and a heavy phase;
   a closure sealing the open end of the container, the closure being formed of a self-sealing, elastomeric material which is penetrable by a cannula through which blood to be separated is conducted into the container;
   an interface-seeking piston assembly having an average specific gravity relatively greater than blood and slidably mounted in the container, adjacent one end thereof and being movable downwardly in said container due to the influence of centrifugal force, said piston having means on an outer surface for providing sealing engagement with an inner surface of the container;
   said piston including a resilient diaphragm having apertures formed therein and mounted at the lower end thereof, said apertures being normally closed and adapted to open during the downward movement of the piston
   a filter assembly mounted on said piston and being in fluid communication with said diaphragm, said filter assembly including a coarse filter disposed adjacent said diaphragm, said coarse filter having an average pore size greater than the cellular phase of blood, but small enough to remove fibrin strands, and a fine filter having pore openings smaller than said cellular phase, said fine filter disposed in tandem relation with and above said coarse filter so that said coarse filter pre-filters all serum/plasma which passes through the apertures of said diaphragm during operation of the assembly before said plasma/serum reaches said fine filter, said filter assembly being capable of removing substantially all solid material from the separated plasma/serum phase; and
   said fine filter providing piston stop means when said piston is at the plasma/serum-cellular interface whereby the cellular phase clogs the filter to prevent the upward flow of plasma/serum through said filter assembly whereby the piston automatically stops at said interface and the diaphragm apertures automatically close.

2. The separator assembly of claim 1 wherein the piston includes a second resilient diaphragm having apertures therein and being disposed above said fine filter to form a sealed barrier between the separated phases.

3. The separator assembly of claim 2 wherein said filter assembly is disposed in a passage formed through said piston, the lower end of said passage being normally closed by said resilient diaphragm and the upper end of said passage being normally closed by said second resilient diaphragm.

4. An interface-seeking piston adapted for use for separating the serum or plasma phase from the cellular phase of blood in a separator assembly including a container, said piston comprising an elastomeric body having a specific gravity relatively greater than blood and having means on an outer surface for providing sealing engagement with an inner surface of the container into which said piston is to be mounted adjacent one end thereof and being movable downwardly in said container due to centrifugal force;
   a resilient diaphragm having apertures formed therein mounted on the piston and disposed at the lower end thereof;
   said apertures being normally closed and adapted to open during the downward movement of the piston;
   a filter assembly mounted on said piston and being in fluid communication with the diaphragm, said filter assembly including a coarse filter disposed adjacent said diaphragm and having an average pore size greater than the cellular phase of blood but small enough to remove fibrin stands, a fine filter having pore openings smaller than the cellular phase;
   said fine filter being disposed in tandem relation with and above said coarse filter so that said coarse filter pre-filters all serum/plasma which passes through the apertures of said diaphragm during operation of the assembly before said serum-plasma reaches said fine filter, said filter assembly being capable of removing substantially all solid material from the separated plasma/serum phase.

5. The piston of claim 4 wherein the piston includes a second resilient diaphragm having apertures therein and being mounted above said fine filter.

6. The piston of claim 5 wherein said filter assembly is disposed in a passage formed through said piston, the lower end of said passage being normally closed by said resilient diaphragm and the upper end of said passage being normally closed by said second resilient diaphragm.

* * * * *